United States Patent [19]
Lakhani

[11] Patent Number: 6,037,992
[45] Date of Patent: Mar. 14, 2000

[54] AUDIO TRANSMISSION IN THE VIDEO STREAM WITH ADAPTIVE GAIN

[75] Inventor: Karim Lakhani, Burnaby, Canada

[73] Assignee: Advanced Interactive Corp., Vancouver, Canada

[21] Appl. No.: 09/036,659

[22] Filed: Mar. 6, 1998

[51] Int. Cl.[7] .................................................. H04N 7/08
[52] U.S. Cl. ........................................... 348/484; 348/480
[58] Field of Search ...................................... 348/479–485

[56] References Cited

U.S. PATENT DOCUMENTS

| | | | |
|---|---|---|---|
| 3,902,007 | 8/1975 | Justice | 348/482 |
| 4,429,332 | 1/1984 | Pargee, Jr. | 348/484 |
| 4,652,919 | 3/1987 | Devino | 348/484 |
| 4,665,431 | 5/1987 | Cooper | 348/480 |
| 5,675,388 | 10/1997 | Cooper | 348/484 |
| 5,751,366 | 5/1998 | Hobbs | 348/480 |

*Primary Examiner*—Victor R. Kostak
*Attorney, Agent, or Firm*—Herbert M. Shapiro

[57] ABSTRACT

An improved system for transmitting audio signals in a TV strewn employs an adaptive gain system. The system provides for sampling the audio signal in each of successive intervals in between 256 ($2^8$) and 65,535 ($2^{16}$) steps, for determining a reference voltage (i.e. maximum or mean, ...) amplitude for the interval, for dividing the signal into 256 steps, for providing a scaling factor for each of the steps which is a direct function of the reference voltage, and for transmitting the audio signal (interval) along with a code representative of the scaling factor to permit a receiver to faithfully reproduce the signal.

13 Claims, 4 Drawing Sheets

AUDIO TRANSMISSION IN THE VIDEO STREAM WITH ADAPTIVE GAIN

FIELD OF THE INVENTION

This invention relates to the transmission of audio signals over, for example, cable systems where the audio signal is imbedded in the video stream.

BACKGROUND OF THE INVENTION

The transmission of audio in a video stream is disclosed in U.S. Pat. No. 4,429,332 issued January, 1984. But a problem exists in trying to encode a 96 db (16-bits) dynamic range audio signal into a 48 db (8-bits) dynamic range video signal.

The audio signal is placed in the active portion of a horizontal line in the video signal which is approximately fifty-three micro seconds in length. The amplitude resolution available in the video channel is normally 48 db (8-bits) or 0 to 255 levels. But a compact disc (CD) quality audio signal has 96 db (16-bits) dynamic range and thus the problem exists as to how to transmit an audio signal with 96 db dynamic range into a video channel with 48 db (8-bits) dynamic range and at the receive end retain the full dynamic range.

BRIEF DESCRIPTION OF THE INVENTION

In accordance with the principles of this invention an adaptive gain system samples the amplitude of the audio signals over a sample interval and applies large step size if high amplitude signals are present during the short sample interval and applies small step size if low amplitude signals are present. Typically, 33.3 milliseconds of audio is coded in 53 microseconds of video signal. In accordance with the principles of this invention, the audio signal is sampled in up to 65536 ($2^6$ or 16-bits) levels. The audio signal is sampled over the 33.3 milliseconds interval. The reference level (max) is determined and a scaling factor is determined which characterizes that amplitude in less than 256 ($2^8$ or 8-bits) levels and all other samples are scaled using the same scaling factor. In one embodiment, if sampling indicates that the largest amplitude over the sampling interval is large and since the system can distinguish only 256 ($2^8$ or 8-bits) levels out of 65,536 ($2^{16}$ or 16-bits), then the scaling factor is 256 for each level. If, on the other hand, the largest amplitude over the sampling period is small and the maximum sample value in the sample period is 255, then the scaling factor is 1 for all the samples in the sampling interval.

The sampling interval, conveniently, is one video frame time and the sampled audio is encoded into one horizontal line of video. The scaling factor value is added in the transmission to tell the receiver what scaling factor to use to reproduce the original signal at the receive end.

DETAILED DESCRIPTION OF AN ILLUSTRATIVE EMBODIMENT OF THIS INVENTION

Figure 1:
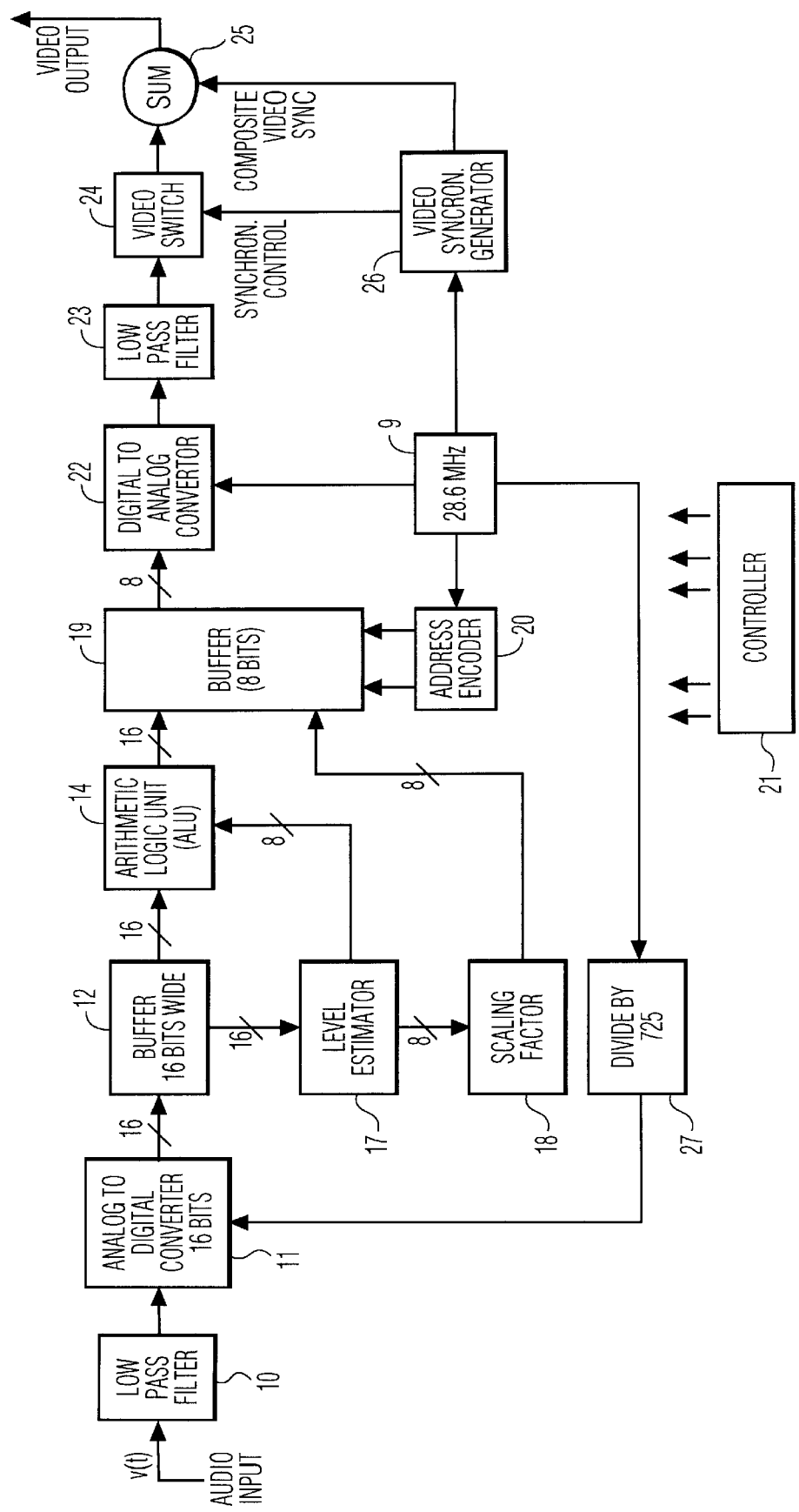
FIG. 1 is a schematic block diagram of a television (TV) transmission system representing, for example, a cable head end.

FIG. 1 is a block diagram of an encoding arrangement, in accordance with this invention, for a television (TV) station (e.g. cable head end). The encoder includes a low pass filter (LPF) 10, the input to which comprises an high dynamic range audio signal. The output of the LPF 10, is fed into a 16-bit analogue to digital (A/D) converter 11. The output of A/D converter 11 is applied to the input of buffer 12. Both the buffer and the converter are 16-bit components and are commercially available. The output of buffer 12 is applied to the 16-bit input of an arithmetic logic unit (ALU) 14.

An output of buffer 12 is also applied to the 16 bit input of level estimator 17. The scaling factor output of level estimator 17 is fed into the 8-bit input of the ALU 14, and also applied to circuit 18 which captures this scaling factor information as will become clear hereinafter.

The 8-bit output of ALU 14 is the 16-bit input of the ALU 14 divide by the 8-bit input of ALU 14. This 8-bit output of ALU 14, is a scaled audio sample, a 16-bit audio sample scaled to 8 bits by the 8-bit scaling factor from level estimator 17. The 8-bit output of ALU 14 and the output of circuit 18 are applied to inputs of buffer 19. Buffer 19 is an 8-bit buffer and the input and output to the buffer are also 8-bits as indicated in the drawing. Information (audio scaled samples) are stored in and retrieved from buffer 19 at addresses determined by address encoder 20. The output of buffer 19 is fed into an 8-bit digital to analogue (D/A) converter 22. The output sampling frequency of the D/A converter 22 is 28.6 megahertz (MHz) or 8 times the color burst frequency (fsc) of 3.58 MHz. The output of 8-bit D/A 22 is fed into LPF 23. The output of the LPF 23, if fed into video switch 24. The output operation of video switch 24 is controlled by Video Sync Generator 26. The output of video switch 24 is fed into a summing circuit 25. The second input of summing circuit 25 is a composite sync signal from Video Sync Generator 26.

The audio sampling frequency of A/D converter 11 is 28.6 MHz frequency of circuit 9 divided by 725 by circuit 27. The 28.6 MHz clock rate of circuit 9 is 8 times the color burst frequency of 3.58 MHz. The 28.6 MHz clock is in sync with the composite video signal of Video Synch Generator 26.

The operation of the address encoder 20 is under the control of a controller 21, which may be any microprocessor capable of operating to clock and activating the various components of the circuit of FIG. 1.

Figure 2:
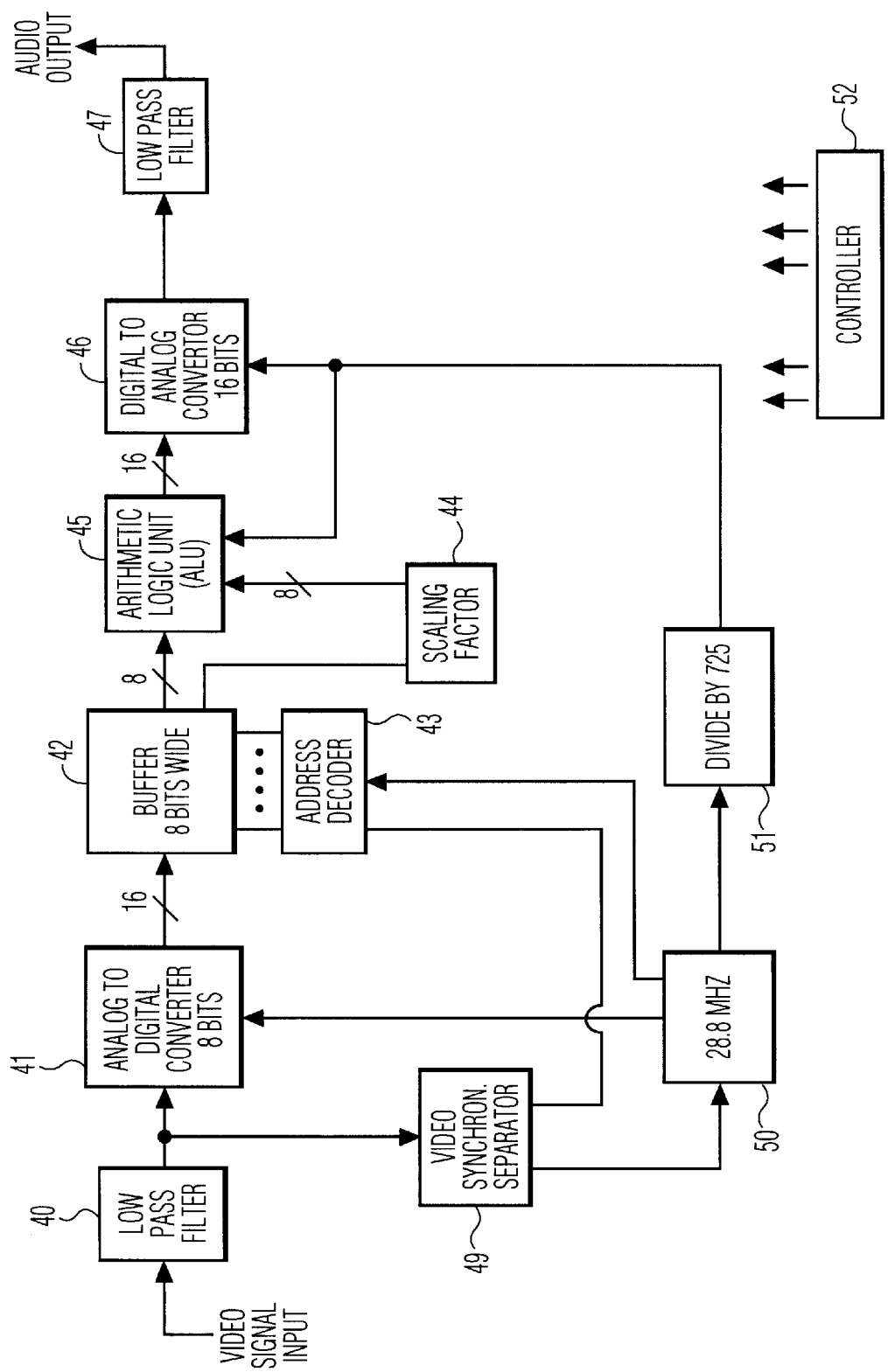
FIG. 2 is a schematic block diagram of the circuit arrangements at the subscriber for receiving audio signals with adaptive gain in accordance with the principles of this invention.

FIG. 2 is a block diagram of a decoder (or receiver), in accordance with this invention, for receiving audio transmission encoded into video by an arrangement shown in FIG. 1. The decoder includes a low pass filter (LPF) 40 that is fed an input video signal that is encoded with an audio signal using the arrangement shown in FIG. 1. The output of the LPF 40 is fed into an 8-bit A/D converter 41. The sampling rate for the 8-bit A/D convert in this case is 28.6 MHz produced by clocking circuit 50. The 28.6 MHz clock of circuit 50 is in sync with the video signal of video sync separator 49. The 28.6 MHz clock of circuit 50 is also fed to the address decoder 43. Address decoder 43 controls the address space of buffer 42. The output of the buffer 42 is applied to the 8-bit input of the ALU 45 under control of address decoder 43. The scaling factor encoded in the video is decoded by the address decoder 43 and fed from buffer 42 into scaling factor holding circuit 44. The output of scaling factor 44 is fed into the second 8-bit input of ALU 45. The 16-bit output of ALU 45 is the 8-bit input of buffer 42 multiplied by the 8-bit input from the scaling factor 44. The 16-bit output of ALU 45 is fed into the 16-bit input of 16-bit D/A converter 46. The output of 16-bit D/A 46 is fed into LPF 47. The output of LPF 47 is high dynamic range audio signal. The output of LPF 40 is also fed into a video sync separator circuit 49 which decoded the horizontal and vertical sync information from the video signal. The output of the Video Sync separator circuit is fed into the Address Decoder circuit 43 and the clock generator circuit 50. The overall operation of the address decoder circuit 43 and the rest of the components of FIG. 2 are under the control of controller 52. Controller 52 may be any microprocessor capable of operating to clock and activating the various components of the circuit of FIG. 2.

The system of FIG. 1 is operative to divide consecutive sample audio intervals in a video stream into quantized steps and to determine whether the amplitude of the average (or the maximum) step is small or large. Illustratively, 1318 samples are taken over a 33.3 millisecond interval. The samples can have values from 0 to 65,535. ($2^{16}$) The highest sample value is determined over the sampling interval of 33.3 milliseconds or 1318 samples. A scaling factor is then determined such that the highest sample value can be divided into 256 steps. The scaling factor being the quantized step size in this case. Assuming the system determines the highest sample value in the sampling interval to be 65,535. In this case the scaling factor or quantized step size is 255. If the highest sample value is 255 then the scaling factor or quantized step size is 1. The quantized step size can range from 1 to 256. For large signals the quantized step size is large and for small signals the quantized step size is small.

The system may be adapted to scale more than just high and low audio signals. Scaling may be done using the mean, or average signal rather than just the maximum level. In any case the audio signal is sampled over a short time interval and the most optimum scaling factor is determined for the signal. The scaling factor is used to scale the samples to fit into the available dynamic range of the transmitting channel. The scaling factor and the scaled samples are then transmitted through the channel. At the receive end scaled samples and the scaling factor are determined. The inverse function of the transmitter function is carried out at the receiver and the original sample are derived.

We will assume that the signal at the transmitter/encoder is quantized into a total of M levels, with q the spacing in volts between adjacent levels. With a maximum plus minu signal excursion of P volts, or a maximum excursion positive or negatively of V volts:

$$q = P/M \text{ or } q = 2V/M;$$

(The continuous audio signal is assumed to have 0 average value, or no dc component) The quantizing amplitude will be +−(q/2, 3q/2, . . . ,(M−1)q/2) and the quantized samples will cover a range $$A = (M-1)q \text{ volts}$$

If e represents the error voltage between the instantaneous (actual) signal and its quantized equivalent, then the mean-squared value of e is:

$$E(e) = q^2/12$$

with the symbol E(.) representing statistical expectation. The average value of the error is zero in this case/model. The rms error is then q/(2sqr3) volts, and this represents the rms "noise" at the quantized output.

Since V=qM/2 is the peak excursion, the ratio of peak signal voltage to rms noise is:

$$Sv/Nv = 3M^2$$

The corresponding power ratio is:

$$S/N = 3M^2$$

or, in decibels, $$(S/N)dB = 4.8 + 20 \log M$$

if M=2, then $$(S/N)dB = 4.8 + 6$$

For a 256-level system (S/N)dB=53 dB.

The mean power is
$S = (M^2-1) q^2/12$ assuming all signal levels are equally likely. Since $N = q^2/12$, the mean power output Signal to Noise Ratio (SNR) is: $S/N = M^2-1$. For a system with 256 levels the quantization SNR is 48 dB.
Simplifications
Let us assume that:

The sampling interval (block) corresponds to the audio sequence that can be compressed into the time interval equal to less than the horizontal active line (50–53 microseconds); say 33.3 msec.

The quantization step $q_i$ is a multiple of the smallest (reference) step q; The range and the number of the quantization characteristics Under previous simplifications we have $$d_{range} = d_{max}/d_{min} = (2^8)d/d = 256$$

or $$(d_{range})_{dB} = 48 \text{ dB}.$$

In total, we have 256 different (linear) quantization characteristics with quantization steps:

$$q, 2q, 3q, 4q, \ldots, 253q, 254q, 255q, 256q$$

In all cases
the quantization S/N=53 db peak signal,
or
the quantization SNR is 48 db for the mean signal power.
If the rms error q/(2sqr3) volts=Nv, the corresponding values for the rms "noise" are:

$$Nv \text{ times } (1, 2, 4, 8, 16, 32, 64, 128, 256)$$

The corresponding quantizing noise powers are:

$$N \times (1, 4, 16, 64, 256, \ldots 2^{16})$$

or $$N_{max}/N = 2^{16}, \text{ that is } 48 \text{ dB}.$$

The system of FIG. 1 is operative to increase the dynamic range of an audio signal embedded in a TV signal by up to 256 times that of the prior art systems without virtually any loss in signal-to-noise ratio (SNR). The scaling factor or quantizing step size, with which quantization characteristics are used, must be error free, requiring error correction or repetition. In the case of an unrecoverable error the previous sampling intervals scaling factor would be applied to the samples in the current interval.

Estimation delay depends upon the (input) buffer size which, in turn, depends on the way the scaling factor is transmitted. In the illustrative arrangement herein, the scaling factor is transmitted at the beginning of every horizontal video line.

Figure 3:
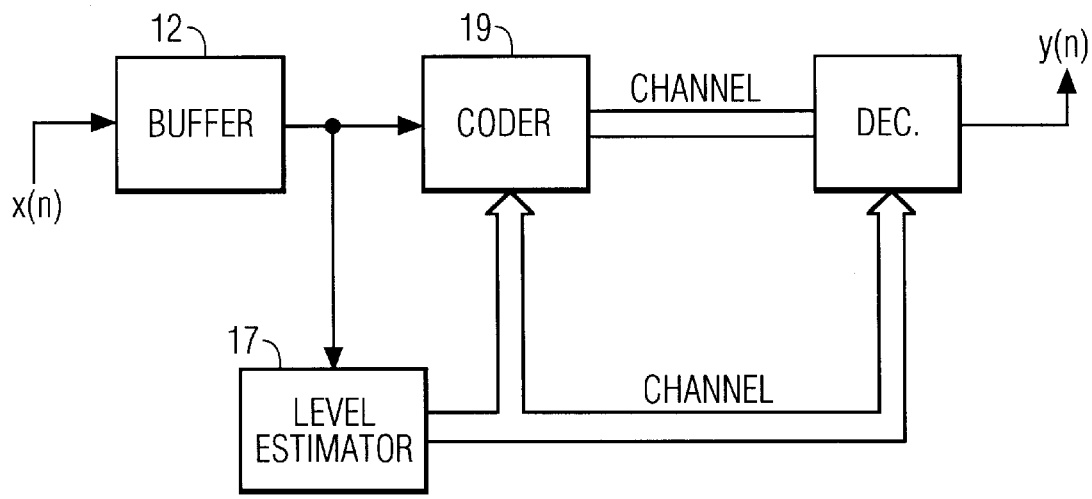
FIG. 3 is a simplified block diagram of the system of FIGS. 1 and 2.

The system is operative in two different modes; quantization with forward estimation (AQF) and quantization with backward estimation; FIG. 3 illustrates quantization with forward estimation showing a simplified block diagram of pertinent components of FIGS. 1 and 2.

Forward estimates of step size are not affected by quantization noise. Further, the AQF technique implies that scaling factor is to be transmitted explicitly to a remote decoder (FIG. 2 scaling factor 44). An estimated delay in the encoding operation (sampling interval) is selected to correspond to the audio sequence that can be compressed into a time interval (aHA) which equals the horizontal line active interval (HA) minus the time interval required to transmit the scaling factor (SI). In our illustrative example the audio can be coded into 46 microseconds, (1318 samples at 28.6 MHz.). AQF also utilizes a buffering of "unquantized" input samples—16-bit samples here.

Figure 5:
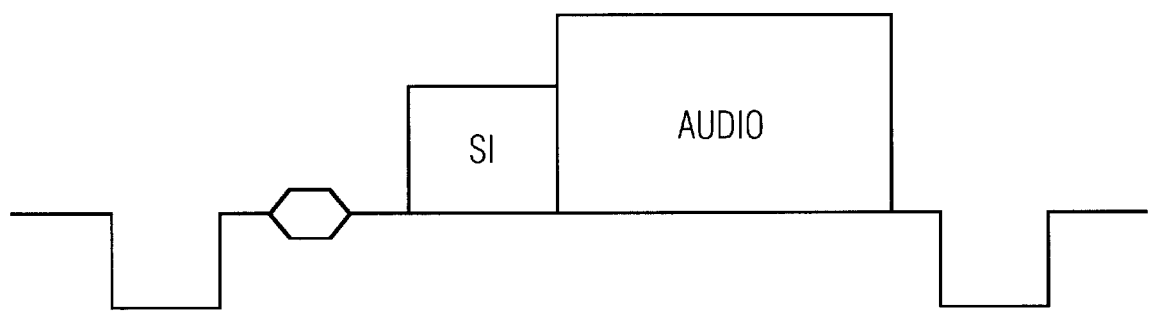
FIG. 5 is a schematic representations of the transmitted audio signal in accordance with the principles of this invention.
Figure 4A:
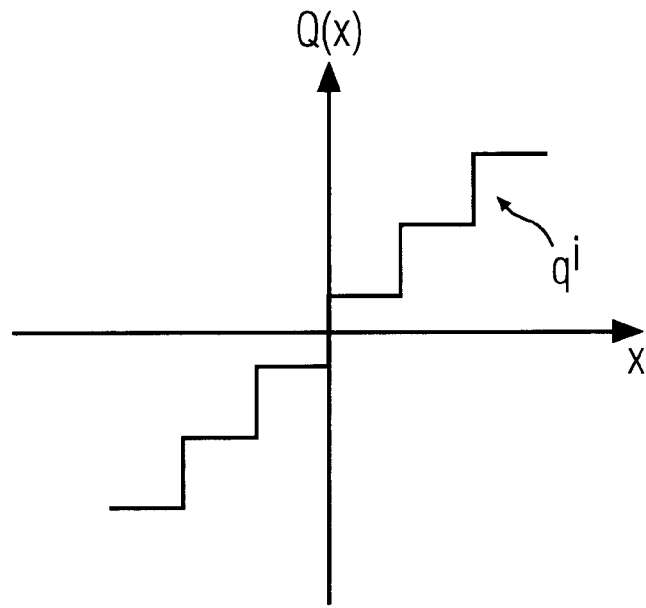
FIGS. 4a and 4b are plots of signal step configurations.
Figure 4B:
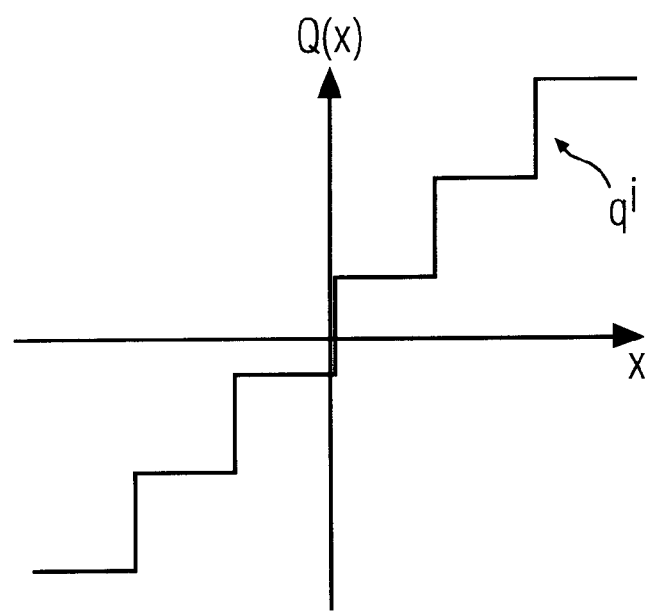

Level estimates based on maximum magnitude statistics are assumed. The step size $q_i$=1, 2, 3, 4, . . . 256 is shown in FIGS. 4a and 4b. A line in an audio frame has two portions: A scaling information portion and an audio portion shown in FIG. 5. The scaling information consists of the synchronization sequence and the scaling factor coded into two bytes with error detection and correction information.

The synchronization sequence consists of 16 bits divided into two groups. The clock synchronization (SC) sequence (8-bits) and the framing code or Byte synchronization (BS) sequence (8-bits). The first 8 bits (CS) consists of an alternating sequence of ones and zeros. The first transmitted bit is 1. The clock synch sequence provides a reference to synchronize the receiver's data clock and initialize the data slicer.

Bits 9 through 16 of the synch sequence constitute the Framing Code and are used as a reference for byte synchronization.

The Framing Code for North American Broadcast Teletext Standard (NABTS) is specified as:

| 1 | 1 | 1 | 0 | 0 | 1 | 1 | 1 |
|---|---|---|---|---|---|---|---|
| b8 | b7 | b6 | b5 | b4 | b3 | b2 | b1 |

Bit b1 is transmitted first, and bit b8 is transmitted last

The transmission bit rate $R_b$ is: $R_b$=(8/5)fsc=5,727,272 bits/sec;

Period of each byte ($T_b$) is:

$$T_b=1/R_b=174.6 \text{ nsec.}$$

If the synch sequence is two bytes, the time interval is:

$$16 \text{ bits} * T_b=2.793 \text{ usec.}$$

The scaling factor is coded as two Hamming coded bytes. Both the bytes are coded in a similar faction. Bits 8, 6, 4, and 2 are data bits. Bits 7, 5, 3, and 1 are encoded using the following:
ENCODING: The protection bits are derived as follows (# means exclusive OR):

b7=b8#b6#b4
b5=b6#b4#(NOT b2)
b3=b4#(NOT b2)#b8
b1=(NOT b2)#b8#b6
DECODING:
A=b8#b6#b2#b1
B=b8#b4#b3#b2
C=b6#b5#b1#b2
D=b8#b7#b6#b5#b4#b4#b3#b2#b1

| A | B | C | D | INTERPRETATION | INFORMATION |
|---|---|---|---|---|---|
| 1 | 1 | 1 | 1 | NO ERROR | ACCEPTED |
| 0 | 0 | 1 | 0 | ERROR IN b8 | CORRECTED |
| 1 | 1 | 1 | 0 | ERROR IN b7 | ACCEPTED |
| 0 | 1 | 0 | 0 | ERROR IN b6 | CORRECTED |
| 1 | 1 | 0 | 0 | ERROR IN b5 | ACCEPTED |
| 1 | 0 | 0 | 0 | ERROR IN b4 | CORRECTED |
| 1 | 0 | 1 | 0 | ERROR IN b3 | ACCEPTED |
| 0 | 0 | 0 | 0 | ERROR IN b2 | CORRECTED |
| 0 | 1 | 1 | 0 | ERROR IN b1 | ACCEPTED |
| 0 | 0 | 0 | 1 | MULTIPLE ERRORS | REJECTED |

The number of bits required to code the scaling information is 16 bits plus the 16 bits of framing sequence. A total of 32 bits are requires:

$$40 * T_b=5.587 \text{ usec.}$$

Therefore the remaining active interval for coding the audio, aHA is, $$aHA=53 \text{ usec}-5.587 \text{ usec}=47.413 \text{ usec.}$$

We assume that the system clock frequency ($f_c$) is: $f_c$=28.6 MHz. To encode 1318 samples at a frequency of 28.6 MHz requires:

$$1318 * 1/28.6 \text{MHz}=46.025 \text{ usec.}$$

The audio sampling frequency (fsam) is fc/725. Assumed requirements:
  Integer relationship to 28.63636 MHz
  Audio sampling frequency is 28.63636 MHz/725=39,498 Hz
At a sampling frequency of 39,498 Hz a total of 1318 samples would be samples in the span of 33.33 msec.

What is claimed is:

1. Apparatus for transmitting audio signals embedded in a video stream where the audio signals have scaling factors which are different at different levels depending on a reference amplitude determined in each of successive sampling intervals of said audio signals, said apparatus including means for dividing the audio signal in each of said intervals into a number of steps, means for determining a reference amplitude for each of said intervals, and means for transmitting in a horizontal line of said video stream the audio signals in each of said intervals along with a scaling factor which is a function of said reference amplitude.

2. Apparatus as in claim 1 also including means for generating a code representative of said scaling factor, said means for transmitting also transmitting said code.

3. Apparatus for transmitting audio signals embedded in a video where the audio signals are scaled at different levels depending on a reference amplitude determined in each of successive sampling intervals of said audio signals, said apparatus including means for dividing the audio signal in each of said intervals into a number of steps, means for determining a reference amplitude for said samples, and means for transmitting the audio signal in each of said intervals with a scaling factor which is an inverse function of said reference amplitude.

4. Apparatus as in claim 3 wherein said scaling factor is relatively low for high reference amplitude and high for low reference amplitude in each of said intervals.

5. Apparatus as in claim 3 also including means for encoding a clocking sequence in said video steam where said clocking sequence also is encoded in the video.

6. A method for transmitting an audio signal in a video signal where the audio signals are scaled at different levels depending on a reference amplitude determined in each of successive sampling intervals of said audio signal, said method including the steps of sampling said audio signals in each of said intervals, determining a reference level for each of said intervals, scaling the sampled signal with respect to said reference level, coding the scaled sampled signals upon at least one horizontal line of said video signal and means for transmitting said video signal along with the scaled audio signal samples at video frequencies.

7. A method as in claim 6 wherein the audio signal in each of said successive sampling intervals is scaled according to an inverse function of the reference level for that sampling interval.

8. A method as in claim 6 wherein the audio signal in each of said sampling intervals is sampled at audio frequencies.

9. A method as in claim 8 wherein each of the audio sampling frequency is synchronized with the video line scanning frequency.

10. The method as in claim 6 in which the scaled samples and the scaling factor are coded on different horizontal lines in the video signal.

11. The method as in claim 7 in which the play out of the inverse scaled samples is at a rate higher than the normal audio playback rate.

12. The method as in claim 6 in which sampled scaled information and the associated scaling factor are entered upon the active portion of a horizontal line in the video signal.

13. Apparatus as in claim 3 in combination with a apparatus for receiving an audio encoded video signal, where the audio signal are coded with a scaling factor along with the audio signal coded in the video signal, said apparatus including means for scaling the received audio samples with the information contained in the scaling factor.

* * * * *